UNITED STATES PATENT OFFICE.

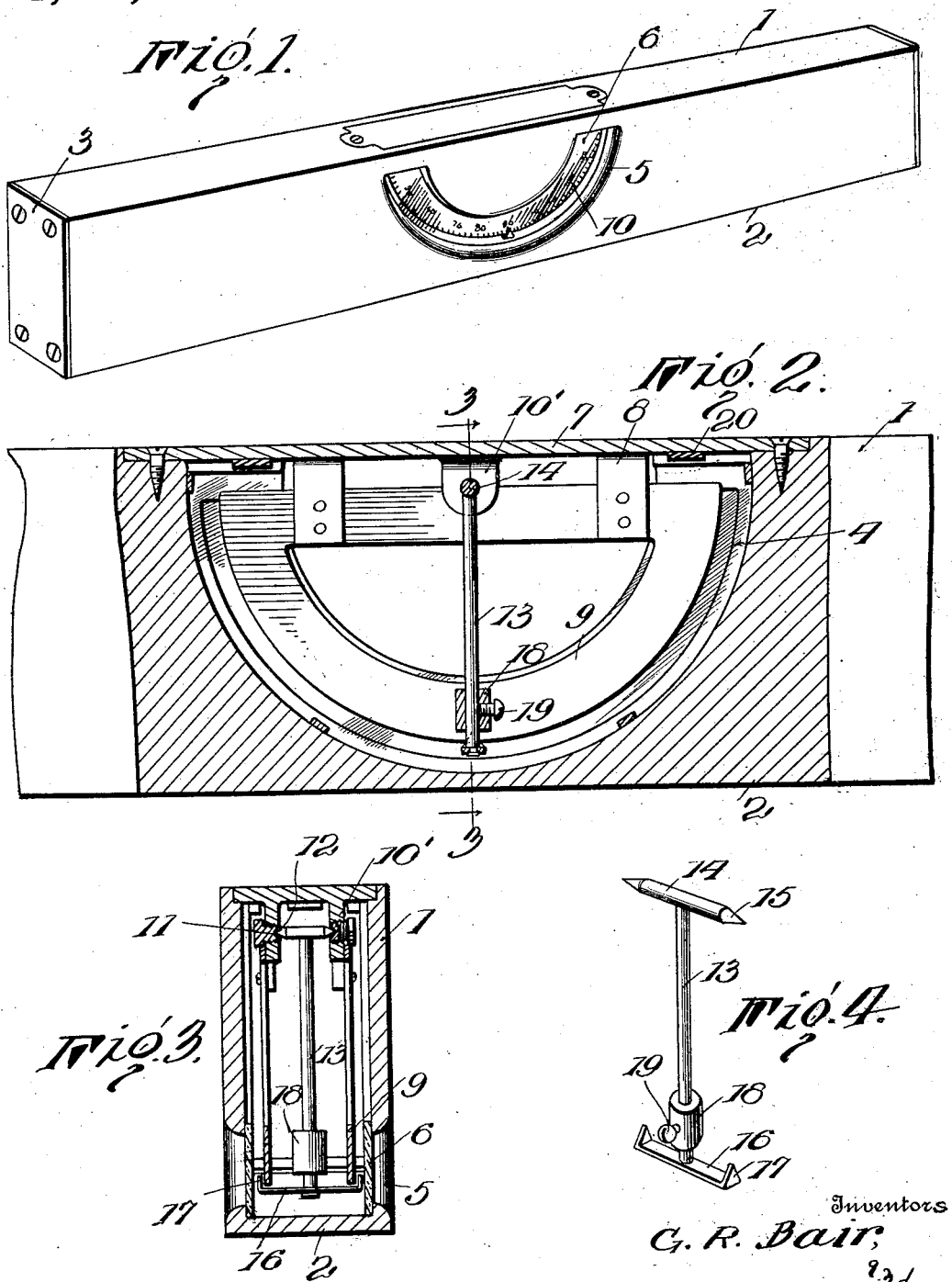

GEORGE R. BAIR AND NORVELLE W. GREENE, OF COLUMBUS, KANSAS, ASSIGNORS OF ONE-THIRD TO CHARLES E. JONES, OF COLUMBUS, KANSAS.

LEVEL.

1,239,336.        Specification of Letters Patent.        Patented Sept. 4, 1917.

Application filed November 8, 1916. Serial No. 130,206.

*To all whom it may concern:*

Be it known that we, GEORGE R. BAIR and NORVELLE W. GREENE, citizens of the United States, residing at Columbus, in the county of Cherokee and State of Kansas, have invented certain new and useful Improvements in Levels, of which the following is a specification.

This invention has as its object to provide a novel and accurate level and inclination gage and it is one aim of the invention to so construct the implement that the same will be more durable than the ordinary spirit level and will be capable of more universal use than such an instrument inasmuch as it may be employed both as a level and as a gage for determining the inclination of the work to which it is applied, the instrument being constructed in such manner that it will indicate with great accuracy the exact inclination of such work.

In the accompanying drawings—

Figure 1 is a perspective view of the instrument,

Fig. 2 is a detail vertical longitudinal section view through the central portion of the instrument, Fig. 3 is a vertical transverse sectional view on the line 3—3 of Fig. 2, and Fig. 4 is a perspective view of the indicator removed from its bearings in the instrument.

In the drawings, the stock of the instrument is indicated by the numeral 1 and the said stock as in the case of the ordinary spirit level is accurately squared so that its face which is indicated by the numeral 2 in the drawings is adapted to be placed flat against a piece of work the inclination of which it is desired to determine. It is also preferable that the stock be provided at each end with a butt plate 3. Preferably, midway between its ends, the face of the stock opposite the face 2 is formed with a recess 4 which houses the indicating device embodying the present invention and the side faces of the stock are formed with arcuate slots 5 which communicate with the recess 4 and through which the scale and indicator may be conveniently viewed from either side of the instrument, these slots being preferably provided with glass panes 6 which exclude dust from the indicator device and serve to protect the same from the elements and from injury through contact with objects and yet permit of the scale and indicator being viewed.

The indicator device embodying the present invention is supported upon the under side of the plate 7 which is secured upon and countersunk in the upper side of the stock 1, as clearly shown in Figs. 2 and 3 and this plate closes the upper side of the recess 4 in addition to serving as a support for the device. Adjacent each end, the plate is provided with a pair of depending spaced lugs 8 and riveted or otherwise secured to the outwardly presented faces of these lugs and supported by the said lugs are arcuate scale plates 9 each bearing upon its face which is presented toward the adjacent pane 6 series of scale marks indicated at 10 which are arranged as in the ordinary protractor, there being preferably two series of such marks upon each scale plate and one series ranging from 0° to 180° from right to left and the other from 0° to 180° from left to right so that the instrument may be read from either side and when applied to work, inclined either to the right or left with relation to the user of the instrument. The scale plates 9, are, of course, supported in parallel relation to each other and their scale bearing faces are presented toward the panes 6 and may, therefore, be readily viewed through the said panes and the respective slots 5. Between the pairs of lugs, the plate 7 is formed upon its under side with a pair of spaced depending ears 10' into each of which there is threaded a bearing 11 having a bearing socket 12 and the said sockets are conical and are located directly opposite each other. The indicator or pointer includes a stem 13 provided at its upper end with a transverse bar 14 having conical pointed ends 15 which seat within the bearing sockets 12 in the manner clearly shown in Fig. 3 of the drawings. At its lower end, the stem 13 is provided with a transverse head 16 provided at its ends with upstanding substantially triangular pointers 17 which, when the instrument is inclined, move along the scales 10 upon the scale plates 9, the head 16 moving beneath the lower or arcuate outer edges of the scale plates. In order to insure an oscillatory motion of the stem 13 and also in order that the indicator may be more quickly brought to rest when the instrument is applied to a piece of work, a weight 18 is slidably adjustably fitted upon the stem and is secured at the desired adjustment by means of a set screw 19.

In order to guard against injury to the indicator or its bearings, when the instrument is placed in an upright position or is being carried from place to place and the same swings into contact with the plate 7, the plate is provided upon its under side with cushioning pads 20 so located that when the indicator is swung in the direction of the plate 7, it will strike against one or the other of the said pads and the shock of impact will thus be absorbed.

From the foregoing description of the invention, it will be seen that the invention is of extremely simple construction and highly useful and yet it is so constructed that it is not liable to get out of order or require adjustment.

Having thus described the invention, what is claimed as new is:

1. In an instrument of the class described, a stock provided with a recess and in its opposite sides with openings communicating with the recess, a plate closing the top of said recess, spaced scale plates supported beneath the first-mentioned plate and housed within the recess and each having a scale face opposite one of the openings, an indicator arm pivotally mounted beneath the first-mentioned plate for oscillatory movement between the said scale plates, and a cross member at the lower end of the said arm extending beneath the lower edges of the scale plates and having indicator fingers located opposite the scales upon the said plates.

2. In an instrument of the class described, a recessed stock, a plate covering the recess therein, an oscillatory indicator arm mounted for pivotal movement beneath the said plate and within the said recess, and cushioning elements carried by the plate at the ends of the arc described by an abutment portion of the arm.

In testimony whereof we affix our signatures.

GEORGE R. BAIR. [L. S.]
NORVELLE W. GREENE. [L. S.]

Copies of this patent may be obtained for five cents each, by addressing the "Commissioner of Patents, Washington, D. C."